United States Patent [19]

Mills

[11] Patent Number: 5,442,959

[45] Date of Patent: Aug. 22, 1995

[54] SHIELDED TUBULAR SIGHT GAUGE

[76] Inventor: Stephen K. Mills, 8611 S. Louisville, Tulsa, Okla. 74137

[21] Appl. No.: 193,790

[22] Filed: Feb. 9, 1994

[51] Int. Cl.[6] ........................................... G01F 23/02
[52] U.S. Cl. ........................................ 73/326; 73/328
[58] Field of Search ................ 73/325, 326, 328, 323, 73/330

[56] References Cited

U.S. PATENT DOCUMENTS

| | | | |
|---|---|---|---|
| 635,565 | 10/1899 | Mears . | |
| 637,329 | 9/1900 | Brooks et al. | 73/326 |
| 743,178 | 11/1903 | Mears et al. . | |
| 837,467 | 12/1906 | Halliday | 73/326 |
| 845,258 | 2/1907 | Price . | |
| 998,104 | 7/1911 | Leonhardt | 73/326 |
| 1,006,105 | 10/1911 | Leonhardt . | |
| 1,110,974 | 9/1914 | VanBuskirk et al. . | |
| 1,132,372 | 3/1915 | Mears . | |
| 1,157,708 | 10/1915 | McIntosh | 73/326 |
| 1,159,764 | 11/1915 | Heller . | |
| 1,227,196 | 5/1917 | Pocock . | |
| 1,239,304 | 9/1917 | Pocock . | |
| 1,339,599 | 5/1920 | Garren | 73/326 |
| 1,382,582 | 6/1921 | Whiteside | 73/326 |
| 2,083,794 | 6/1937 | Roby | 73/326 |
| 2,533,490 | 12/1950 | McGrath et al. . | |
| 2,792,710 | 5/1957 | Lohr . | |
| 2,904,999 | 9/1959 | Quinn | 73/325 |
| 3,046,785 | 7/1962 | Werter | 73/325 |
| 3,540,276 | 11/1970 | Lyden | 73/328 |
| 4,022,062 | 5/1977 | Basel et al. | 73/325 |
| 4,693,117 | 9/1987 | Mills | 73/326 |
| 4,981,040 | 1/1991 | Lin | 73/323 |
| 5,052,224 | 10/1991 | Ford et al. | 73/325 |

FOREIGN PATENT DOCUMENTS

| | | | |
|---|---|---|---|
| 0480395 | 5/1916 | France | 73/326 |
| 0022267 | 3/1907 | United Kingdom | 73/328 |
| 1148543 | 4/1969 | United Kingdom | 73/326 |

OTHER PUBLICATIONS

FIGS. 1–3 of Australia Patent No. 6642/27 by Howard Vernon Devenport, published Jun. 3, 1927.

Primary Examiner—Diego F. F. Gutierrez
Attorney, Agent, or Firm—Head & Johnson

[57] ABSTRACT

A sight gauge is placed between two spaced apart compression type fittings connected to a vessel to show the liquid level in the vessel. The sight gauge has an elongated tubular transparent tube shield and a slightly longer elongated transparent sight tube that is received within the sight tube shield. An upper and a lower connection plate are each telescopically received by the sight tube, the sight tube shield being captured between the connection plates. An upper and a lower nozzle member each has an opening to respectively capture the upper and lower ends of the sight tube. An upper and lower elastomeric O-ring is received on the sight tube positioned between the connection plates and the nozzle members. Bolts secure the nozzle member to the compression plates to squeeze the O-rings against the sight tube so that the sight tube retains and supports the tube shield. Each nozzle member has an elongated tubular portion that can be received in a compression fitting.

1 Claim, 1 Drawing Sheet

SHIELDED TUBULAR SIGHT GAUGE

BACKGROUND OF THE INVENTION

It has long been a practice to use an elongated tubular member connected with fittings at each end to show the level of liquid in a vessel. This type of fluid level indication is commonly used because it is inexpensive and is fail proof since it does not depend on any mechanical or electrical mechanism to indicate fluid level.

One problem associated with the use of sight tubes for indicating liquid level is the danger of breakage. Any small diameter elongated tube of transparent material, whether glass or plastic, is susceptible of being broken by tools, broom handles, wind-blown objects and so forth. If a sight tube is broken spillage of liquid contents of a vessel can be a problem. The problem can be particularly serious if the vessel contents are hazardous, such as combustible liquids.

An object of the present invention is to provide a sight gauge of improved safety and particularly, one that is easy to repair and economical to manufacture.

Others have provided protective sight gauges. A particularly relevant reference is U.S Pat. No. 4,693,117 that issued on Sep. 15, 1987 entitled "Replacement Element For A Liquid Level Gauge Sight Tube". This patent shows a sight tube arrangement having upper and lower tubular portions that can be expeditiously received in compression type fittings secured to a vessel. This patent teaches a tubular gauge having a metallic shield member surrounding three sides of the sight tube and a transparent window closing the front of the shield. This type liquid level sight gauge has proven very effective in providing increased safety since the sight tube is protected from inadvertent breakage. However, the system of U.S. Pat. No. 4,693,117 has the disadvantage that the metallic shield obscures the sight tube from the sides—a disadvantage that is overcome by this disclosure.

For further background material to sight gauges, see the following previously issued U.S. Pat. Nos.: 635,565; 657,329; 743,178; 837,467; 845,258; 998,104; 1,006,105; 1,110,974; 1,132,372; 1,157,708; 1,159,764; 1,227,196; 1,239,304; 2,533,490 and 2,792,710.

SUMMARY OF THE INVENTION

This invention provides a shielded tubular sight gauge for placement between two spaced apart compressive type fittings connected to a vessel to show a liquid level in the vessel. The liquid level gauge has an elongated tubular transparent tube shield having an upper and a lower end. While the tube shield may be of various cross sectional configurations, such as square or the like, a preferred embodiment includes the use of a cylindrical tubular transparent shield. Received within the tubular shield is a slightly longer and smaller diameter elongated transparent sight tube having upper and lower ends. An upper and a lower connection plate is each telescopically received on the sight tube. The upper connection plate is adjacent the upper end of the sight tube and the lower connection plate is adjacent the lower end of the sight tube. The sight tube shield is supported between the upper and lower connection plates.

An upper and a lower nozzle member is employed, each having an opening to capture the upper and lower ends respectively of the sight tube. An upper and a lower elastomeric O-ring is received on the sight tube. The upper O-ring is positioned between the upper nozzle member and the upper connection plate and, in like manner, the lower O-ring is positioned between the lower nozzle member and the lower connection plate.

Bolts are employed for connecting the upper nozzle member to the upper connection plate to squeeze and compress the upper O-ring therebetween and, in like manner, bolts are employed between the lower nozzle member and the lower connection plate to squeeze the lower O-ring. As the upper and lower O-rings are squeezed they are compressed against the sight tube so that thereby the sight tube positions and supports the sight tube shield.

Each of the nozzle members has an integral extending tubular portion that is coaxial with the sight tube. These nozzle member tubular portions provide means for fitting the liquid level sight gauge between compressive fittings that are typically attached to a vessel.

The liquid level sight gauge has the advantage that the liquid level within the sight tube can be viewed from every angle that is not obscured by the vessel itself—that is, the sight tube is visible from the front or from the sides. Further, the liquid level sight gauge of this invention is economical to manufacture and expeditious to assemble and is easy to use when it is necessary to replace or repair an existing liquid level sight gauge.

A better understanding of this invention will be obtained from reference to the following description of the preferred embodiment, taken in conjunction with the attached drawings.

DESCRIPTION OF THE PREFERRED EMBODIMENT

Figure 1:
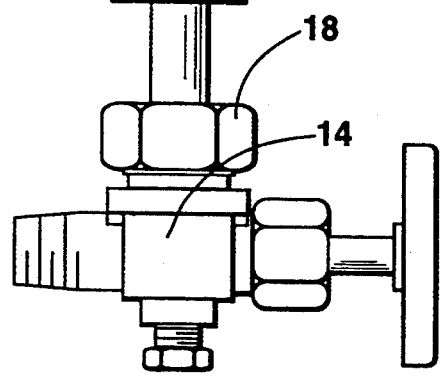
FIG. 1 is an elevational side view of a shielded tubular sight gauge of this invention showing valve controlled compression type fittings that are typically employed on a vessel, the liquid level sight gauge being supported between the compression type fittings.

Referring first to FIG. 1, the shielded tubular sight gauge of this invention is generally indicated by the numeral 10. The gauge is shown supported between an upper compression type fitting 12 and a lower compression type fitting 14. Fittings 12 and 14 are not part of the present invention but are illustrated only as indicating the typical arrangement for mounting liquid level sight gauge 10. Typically, compression fittings 12 and 14 include a threaded portion as illustrated that can be fitted into piping connected with a vessel (not shown) for which visual liquid level is required. Fittings 12 and 14 are also shown with valve handles and so forth so they can be closed off and are shown with compression nuts 16 and 18 by which a tubular portion of liquid level sight gauge 10 may be attached. Compression fittings 12 and 14, with compression nuts 16 and 18, are exemplary of the way liquid level sight gauge 10 can be employed with a vessel.

Figure 2:
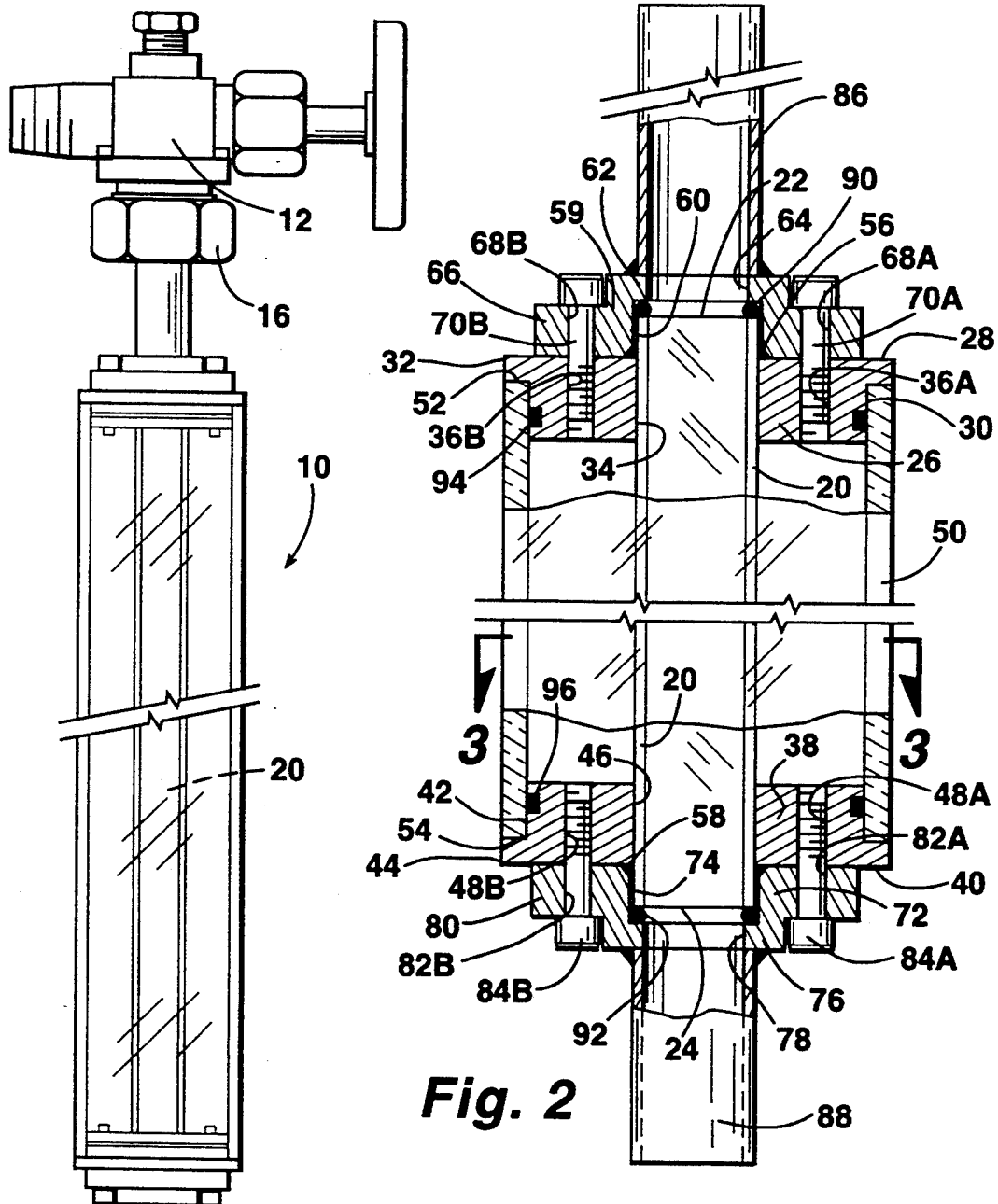
FIG. 2 is a fragmentary enlarged cross-sectional view of the liquid level sight gauge as shown in FIG. 1.
Figure 3:
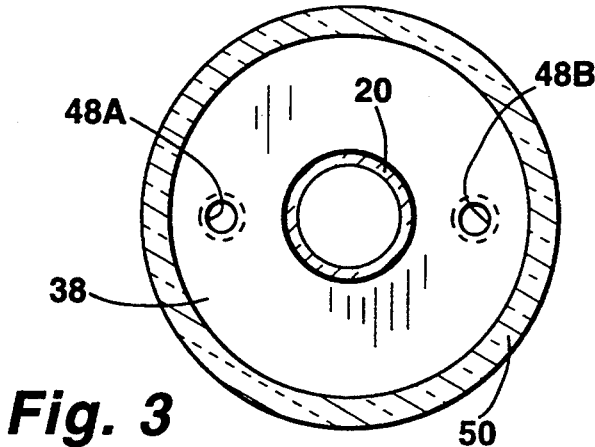
FIG. 3 is a cross-sectional view taken along the line 3—3 of FIG. 2 showing the tubular portion of the upper nozzle member in cross-section and an end view of the sight gauge.

Referring to FIGS. 2 and 3, the liquid level sight gauge which is the subject of this disclosure is illustrated in detail. A transparent sight tube 20 serves as the means for displaying the level of fluid in a vessel. It is typically formed of glass. A typical dimension for sight tube 20 is ⅜" OD by about 30–50" long, although the length of the sight glass, as well as the diameter, can vary according to the application. Sight glass 20 may be provided with a strip of redline adhesive tape (not shown) extending from adjacent opposite ends and positioned on the side of the sight glass tube that is adjacent the vessel (not shown) so as to make it easier to see the liquid level within the sight gage.

Sight tube 20 has an upper end 22 and a lower end 24.

Telescopically received on sight tube 20 is an upper connection plate 26 having an upper surface 28: Upper connection plate 26 has an external circular peripheral surface 30 having an enlarged diameter portion 32 providing a radially extending lip portion. A central opening 34 is formed in upper connection plate 26. Opening 34 receives sight tube 20 so that the upper end thereof extends slightly beyond upper surface 28 of the upper connection plate. Further, the upper connection plate has two spaced apart threaded openings 36A and 36B.

A lower connection plate 38 is identical to the upper connection plate 26 and has a lower surface 40, an external circular peripheral surface 42, an enlarged diameter peripheral surface 44 providing a radially extending lip portion, a central opening 46 and threaded openings 48A and 48B. The lower connection plate is used in an inverted fashion compared to the upper connection plate.

Captured between upper connection plate 26 and lower connection plate 38 is an elongated tubular transparent tube shield 50. Tube shield 50 has an upper end 52 and a lower end 54, the upper end engaging the lip portion formed by the enlarged circumferential diameter 32 of upper connection plate 26. The tube shield lower end 54 engages the lip portion formed by the enlarged diameter portion 44 of lower connection plate 38. Tube shield 50 is formed of a transparent material and could be made of glass, however, a highly preferred embodiment is the use of polycarbonate. Polycarbonate, tubing is highly resistant to breakage compared to glass tubing. The dimensions of shield tube 50 may be typically 2" O.D. with ⅛" wall thickness and approximately 35–50" in length. The length of the sight shield tube 50 is directly related to the length of sight tube 20 and is, as illustrated in FIG. 2, slightly shorter in length so that the opposite ends of sight tube 20 extend beyond upper and lower connection plates 28 and 38.

Positioned on sight tube 20 between the upper end 22 and the top surface 28 of upper connection plate 26 is an upper O-ring 56 and, in like manner, positioned on the lower portion of sight tube 20 above the lower end 24 and in engagement with the lower surface 40 of lower connection plate 38 is a lower O-ring 58. An upper nozzle member 59 is attached to upper connection plate 26. Nozzle member 59 has a cylindrical recess 60 that receives upper end 22 of sight tube 20 and has an integral inwardly extending flange portion 62 having an opening 64 therein that is of substantially the same internal diameter as that of sight tube 20.

Further, upper nozzle member 59 has an integral radially extending larger diameter flange portion 66 having opposed openings 68A and 68B that are in register with openings 36A and 36B of upper connection plate 26. Received in openings 68A and 68B are bolts 70A and 70B that are threadably received in openings 36A and 36B. When bolts 70A and 70B are tightened, upper O-ring 56 is squeezed into compressive engagement with the exterior of sight tube 20.

Positioned at the lower end of the liquid level sight gauge is a lower nozzle member 72 that has a recess 74, an inward flange portion 76, an opening 78, an outward flange portion 80, and openings 82A and 82B the same as the upper nozzle member 59. Lower bolts 84A and 84B serve to clamp lower nozzle portion 72 to lower connection plate 38 to squeeze lower O-ring 58 into sealed engagement with the outer surface of sight tube 20.

Sight tube 20 functions as a retention member to retain the other components of the liquid level sight gauge in an assembled relationship that is achieved by the compressive force applied by upper O-ring 56 and lower O-ring 58.

Extending from upper nozzle member 59 is an integral tubular nozzle connection 86 having an internal diameter substantially equal to the internal diameter of sight tube 20. The tubular nozzle connection 86 may be formed integrally with upper nozzle 59 or, as illustrated, may be formed as a separate tubular component and welded to the upper nozzle. In like manner, a lower tubular nozzle connection 88 is either formed integrally with or is, as shown, attached to lower nozzle member 72. The upper and lower tubular nozzle connections 86 and 88 provide means of removably securing the liquid level sight gauge to upper and lower compression fittings such as illustrated by numerals 12 and 14 in FIG. 1. By arranging the spacing between the upper and lower compression fittings and the length of liquid level gauge 10, the gauge may be removed by loosening compression nuts 16 and 18 without otherwise dismantling any portion of the gauge or the fittings which hold it in place. When compression nuts 16 and 18 are loosened, the tubular nozzle compression connection 86 may be slid upwardly enough within compression nut 16 so that lower nozzle connection 88 passes out of the lower compression nut 18, allowing the lower end of the gauge to be moved to one side and the upper tubular nozzle connection 86 then removed from upper compression nut 16. This allows gauge 10 to be expeditiously removed or replaced for cleaning or other purposes.

Positioned within recess 60 in upper nozzle member 59 and in contact with the inward flange portion 62 is a cushion member 90 in the form of an O-ring. In like manner, an O-ring 92 is positioned in the lower nozzle member 72. The cushion members 90 and 92 serve to centrally position sight tube 20 as the gauge is assembled and thereby prevent stress on the sight tube which might otherwise cause breakage.

Formed in external peripheral surface 30 of upper connection plate 26 is a groove receiving an O-ring 94 that seals against the interior cylindrical surface of tube shield 50. In like manner, an O-ring 96 seals against lower end 54 of tube shield 50. The function of O-ringers 94 and 96 are primarily to seal the interior of tube shield 50 against the entry of dirt or other contamination that would obscure vision of sight tube 20. A secondary function of O-rings 94 and 96 is to catch any fluid that might inadvertently leak past the upper and lower ends of the sight tube.

The liquid level gauge as described herein is an improvement over the prior art in that it provides a visual liquid level gauge characterized by economy and simplicity of construction and one that has the advantage of exposing the sight tube for inspection of liquid level from all directions except from the direction of the vessel to which the gauge is attached.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A shielded sight gauge assembly for placement between two spaced apart compressive type fittings connected so as to show a liquid level comprising:

an elongated tubular transparent sight tube shield having upper and lower ends;

a slightly longer elongated transparent sight tube having upper and lower ends, the sight tube being received in said sight tube shield;

an upper and a lower connection plate each having a circular peripheral surface, each circular peripheral surface having a circumferential groove therein, and each circular peripheral surface having an enlarged diameter portion providing a radially extending lip portion, each upper and lower connection plate having a central opening therein receiving said sight tube respectively adjacent said upper and lower ends thereof;

an O-ring received in said circumferential groove of each of said upper and lower connection plates, said sight tube shield being supported by said upper and lower connection plates between said radially extending lip portions, said O-rings in said circumferential grooves serving to seal the interior of said sight tube shield;

an upper and a lower nozzle member each having an opening therein to respectively capture said upper and lower ends of said sight tube;

an upper and a lower O-ring received on said sight tube adjacent respectively said upper and lower ends thereof, the upper O-ring being positioned between said upper nozzle member and said upper connection plate and said lower O-ring being positioned between said lower nozzle member and said lower connection plate;

bolt means for forcing said upper nozzle member towards said upper connection plate and said lower nozzle member towards said lower connection plate to squeeze said upper and lower O-rings into sealing and retentive engagement with said sight tube whereby said sight tube shield is held in a selected fixed position with respect to said sight tube; and an upper and a lower nozzle connection extending from said upper and lower nozzle members respectively in coaxial alignment with said sight tube, said nozzle connections providing means to connect the shielded tubular sight gauge assembly to spaced apart compression type fittings whereby said sight tube shield is held in fixed sealed relationship with said sight tube, the assembly being positionable between and removable from said spaced apart compressive type fittings as a unit.

* * * * *